C. C. PECK.
METHOD OF TREATING WATER IN MANUFACTURING ICE.
APPLICATION FILED FEB. 23, 1911.
1,001,885.
Patented Aug. 29, 1911.
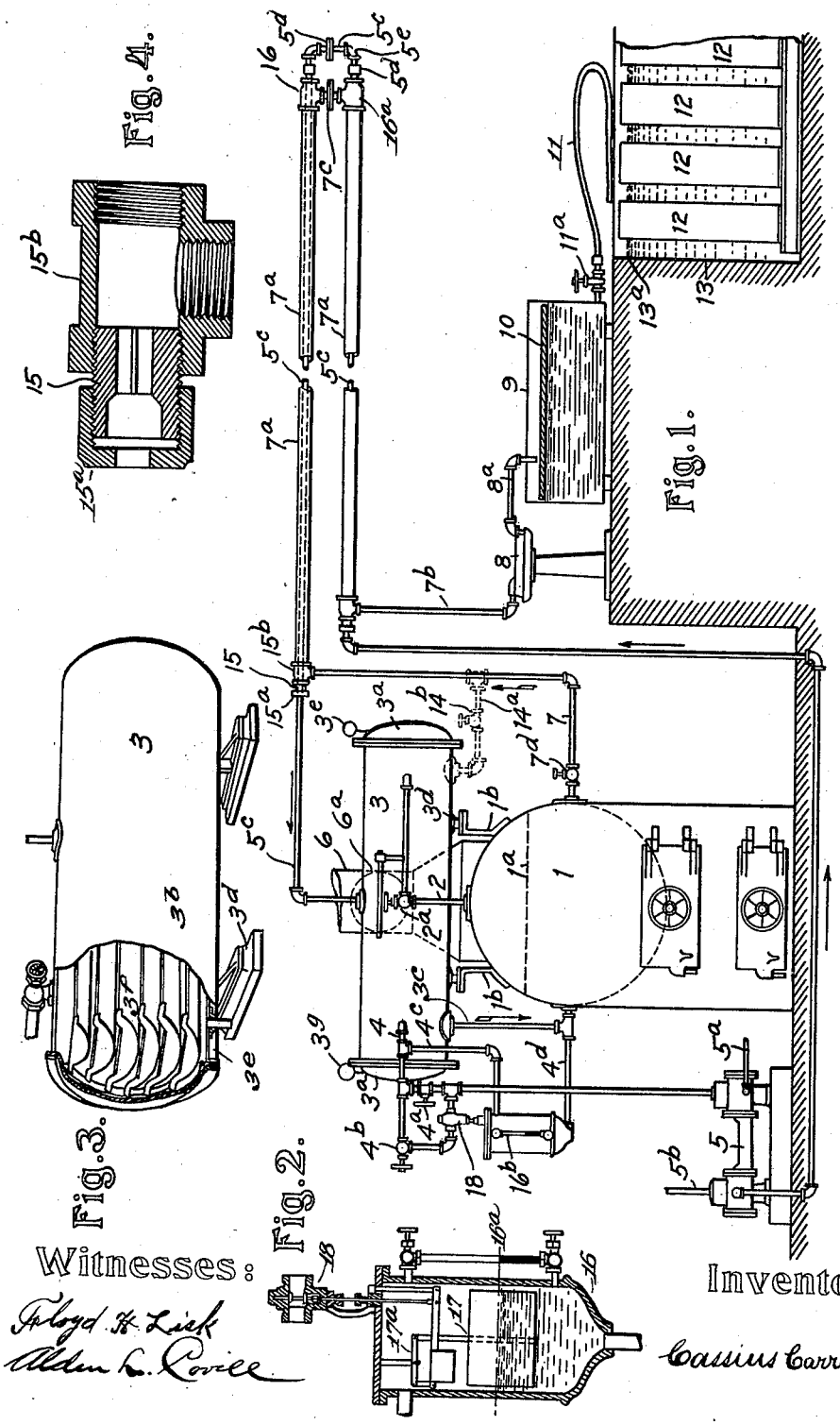

UNITED STATES PATENT OFFICE.

CASSIUS CARROLL PECK, OF ROCHESTER, NEW YORK.

METHOD OF TREATING WATER IN MANUFACTURING ICE.

1,001,885.  Specification of Letters Patent.  Patented Aug. 29, 1911.

Application filed February 23, 1911. Serial No. 610,438.

*To all whom it may concern:*

Be it known that I, CASSIUS CARROLL PECK, a citizen of the United States, residing at Rochester, in the county of Monroe and State of New York, have invented a new and useful Method of Treating Water in Manufacturing Ice, of which the following is a specification.

My invention relates primarily to the art of manufacturing ice and has for its principal object the use of fresh water rather than distilled water.

It has heretofore been customary in the mechanical production of ice to distil water and use the resulting water of condensation for freezing into blocks, as by this method both air and solid matter are eliminated from the water. The process of distillation is however costly, and ice made from distilled water is liable to be stained by oil contained in exhaust steam commonly used. It moreover multiplies apparatus, increases amount of attention and work required, calls for somewhat more skilled work, and tends to lengthen time required for production. My method takes any ordinary good water and subjects it to proper temperature for sufficient length of time to drive off practically all air and kill all germs, then preferably filters the water and delivers it to freezing apparatus. Only one pump is ordinarily required for handling the water and even that can be dispensed with where reservoir or street pressure is sufficient. Ice made by this process is clear, dense, free from oil stains and practically from air bubbles, and accordingly is attractive in appearance and of durable quality. Water containing air bubbles is more or less white in appearance and the air bubbles tend to collect in the central portion of can-made block ice, giving it a dull appearance and decreasing its solidity and durability.

In the accompanying drawings the method is illustrated in simple manner to show proper application mechanically of the principles involved, the method being adapted for application on either a large scale or a small scale.

Figure 1 is an elevation of apparatus suited for carrying out my method of removing air from water and preparing it for being frozen into block ice. Fig. 2 is an enlarged view of the automatic boiler feeder, the view being a central vertical section of the valve case and the float case and the elevation of the float with compound lever, valve stem and balanced valve. Fig. 3 is an enlarged view of the steam heating chamber for treating fresh water, showing the shell in elevation with sufficient broken away to reveal the internal construction. Fig. 4 is a central vertical section of fittings used in the counter current cooler in connection with running the water supply pipe within the water discharge pipe.

Numeral 1 in Fig. 1 indicates a steam generator which may be of any preferred design, normal water level therein being indicated by broken line $1^a$, a smoke-stack connection 6 being shown with a damper $6^a$. Steam from this generator flows through pipe 2 having stop valve $2^a$ into the cylindrical steam chamber 3 having dished heads $3^a$, as shown more fully in Fig. 1, from which chamber operative steam is supplied through pipe 4 having stop valves $4^a$ and $4^b$ to the water supply pump 5 which has an exhaust steam pipe $5^a$, a water suction pipe $5^b$ and a water delivery pipe $5^c$, through which said water flows to the steam chamber 3, and thence through pipe $3^c$ to boiler 1. It is discharged through pipe 7 and pipe $7^a$ and also $7^b$ into filter 8, which in turn discharges through pipe $8^a$ into tank 9, which is provided with a floating cover 10 and a hose distributing pipe 11 with stop valve $11^a$ for controlling delivery of deaerated water into freezing cans 12 which are set in brine tank 13 in which the brine level is maintained at about $13^a$.

Fig. 2 shows the float case 16 of the automatic feeder in section and the float 17 in elevation, together with the attached compound lever $17^a$ which operates the steam supply valve 18 of pump 5. Water level $16^a$ in the case is shown as corresponding to water level $1^a$ in the boiler, as indicated by water gage $16^b$. A stop valve $4^b$ in the steam pipe 4 can be used to shut off steam from the inlet side of automatic valve 18, and the valve $4^a$ can be used to close pipe 4 at this point and compel steam to flow through valves $4^b$ and 18 in reaching pump 5. A steam equalizing pipe $4^c$ and a water equalizing pipe $4^d$ give necessary communication with the boiler.

In Fig. 3 the heads $3^a$ of steam chamber 3 are bolted on to the shell $3^b$ to allow of removal. The shell has a lagging $3^e$ to prevent waste of heat, and is supported on cradles $3^d$ which are carried on stanchions 1<sup>b</sup> supported by the shell of boiler 1. Water trays 3<sup>f</sup> are set level and water overflows in succession from the top tray to the bottom tray and thence flows through pipe 3<sup>e</sup> into the boiler.

Fig. 4 shows a gland fitting, the stuffing box 15 having a cap 15<sup>a</sup> and a screwed T 15<sup>b</sup>. The return at opposite end of these pipes is formed of two reducing T's 16 and 16<sup>a</sup> usually 2½x1¼x1¼ inches, the inside pipe having a long thread for projecting through the T to receive a coupling 5<sup>d</sup>, as shown in Fig. 1, or the coupling can be omitted and the elbow 5<sup>e</sup> screwed on the end which projects from T 16. Flanges 5<sup>f</sup> and 7<sup>c</sup> connect the pipes 5<sup>c</sup> and 7<sup>a</sup> respectively.

Operation of the system is as follows: Steam is first generated in boiler 1 from which it flows through pipe 2 and stop valve 2<sup>a</sup> into steam chamber 3 until the latter is fully charged with steam at boiler pressure. Steam pump 5 can then be started by opening stop valve 4<sup>a</sup> so that steam may flow from the steam chamber through pipe 4 to the pump, or said valve may be closed and steam conducted to the pump through valve 4<sup>b</sup> and automatic valve 18 which latter maintains a nearly uniform water level in the boiler by rising and sinking of the water level float 17 which acts through compound lever 17<sup>a</sup> to open and close the attached balanced valve. When the float sinks it closes the valve 18<sup>a</sup> and when it rises to a predetermined point it opens said valve The pump draws its supply of water through suction pipe 5<sup>b</sup> from any suitable source and delivers it through pipe 5<sup>c</sup> and the counter current cooler-heater composed of pipes 7<sup>a</sup> and 5<sup>c</sup>, as shown by unfeathered arrows, into the upper tray 3<sup>f</sup> of steam chamber 3. As each tray is filled, the water overflows in thin films, drops, or little streams, into the tray beneath, thus exposing a great extent of surface to contact of steam, the trays being suitably formed for collecting and retaining solid matter precipitated from the water by action of heat. Such matter can be disposed of as need requires by unbolting and opening one or both ends of the chamber, which can be conveniently done by swinging the dished heads from eye-bolts 3<sup>g</sup> by means of one or two tackle blocks with accompanying ropes. The trays can then be removed, cleaned and replaced and the end covers secured in place. In flowing through and over the trays the water is exposed to such intimate contact with the atmosphere of steam which surrounds it that it becomes quickly heated to about steam temperature and remains in this condition most of the time it takes to pass through the steam chamber. This results in expanding all air contained in the water by entrainment, or through being dissolved therein, which consequently assumes the form of small bubbles and these bubbles being lighter than the surrounding water, escape from the water into the steam space while solid matter precipitated from the water remains in the trays or adheres to the outside thereof, thus affording efficient means of purifying the water and further preparing it for being frozen into ice of the best quality. Steam pressure in chamber 3 is preferably such as to properly operate pump 5, and therefore of such temperature as to kill all living germs in the water, making the water as satisfactroy in this respect as that derived from condensation of steam. From the bottom portion of the steam chamber the treated water flows into boiler 1 through pipe 3<sup>e</sup> in order to retain the water as long as practicable under action of heat, but it may be conducted direct from said chamber to the counter current cooler, as shown in broken line, valve 7<sup>d</sup> being closed and valve 14<sup>b</sup> in pipe 14<sup>a</sup> being open. In order to remove all solid matter from the water and give it crystalline clearness it is preferably passed through a filter of suitable design, the typical one shown at 8 indicating one in which filter paper or cloth is used as the filtering medium but which is intended to signify any good filter. From the filter water flows through pipe 8<sup>a</sup> into tank 9 which is intended for storage purposes. As required the cans 12, in which the water is frozen, are filled through hose 11 controlled by valve 11<sup>a</sup>. Freezing is effected by brine which fills tank 13 up to the level 13<sup>a</sup> and which therefore surrounds the sides of the cans. As the freezing process does not constitute a part of this invention, it is not necessary to enter into any description of this step in the art of making ice, it being sufficient to say only that when the water has been frozen the resulting blocks of ice will be clear and dense and that either plate ice or can ice can be made from water thus treated and that the method is fully suitable for making ice in either of these ways.

Steam pressure in chamber 3 is preferably maintained to suit operation of pump 5, or other connected steam-driven apparatus. The process of eliminating air and precipitating solids is expedited by high temperatures, hence it is desirable to employ steam at pressures ordinarily employed in driving pumps, engines and other power apparatus, but lower temperatures which are above the boiling point of water will suffice by giving increased time for heat action on the water.

To avoid any appreciable absorption of air by water which has been subjected to heat treatment, a floating cover 10 is provided for tank 9 to prevent contact of the water with the atmosphere. As fresh surface water often contains air to the extent of five per cent. of its bulk, it is necessary to provide for constant removal of the air which is expelled from the water under treatment, hence a certain volume of mingled air and steam must be constantly withdrawn from boiler 1 and steam chamber 3. The volume of air thus withdrawn must equal that which is expelled from the water. This condition is provided for in taking steam from steam chamber 3 for operating pump 5, and more steam may be taken for other purposes.

An automatic boiler feeder, of which the one illustrated in Figs. 1 and 2 is typical, is preferably used in connection with this system, as the float 17 will control steam supply to pump 5 so that water shall be delivered into steam chamber 3 as fast as it is allowed to escape from the boiler. Not only will water level in the boiler thus be maintained nearly constant, but equal volumes of water flowing in opposite directions through the counter current cooler-heater will have capacity for pretty fully exchanging temperatures to the end of expediting the process of treatment and economizing heat. The counter current exchanger can be variously constructed and the particular form shown is simply a compact arrangement indicative of any suitable construction for effecting the same end.

I do not in any respect confine myself to the particular apparatus shown and described as illustrating my method of preparing raw water for being frozen into blocks of ice, as various modifications are required to suit locations and conditions of use while not departing from the general and essential method herein shown and described.

What I claim as my invention and desire to secure by Letters Patent is;—

1. The method of preparing water for ice-making, consisting in heating and constantly maintaining the water above its boiling point until practically all air is expelled therefrom in a receptacle closed against the atmosphere; maintaining a steam space in said receptacle; connecting said steam space with steam using apparatus adapted to constantly withdraw steam and air from the receptacle; and continuously supplying untreated water to the receptacle and discharging treated water therefrom in such manner that the outgoing water heats the incoming water.

2. The method of expelling air from water for ice-making, consisting in heating and constantly maintaining the water above its boiling point under atmospheric pressure until practically all air is expelled therefrom in a receptacle closed against the atmosphere; maintaining a steam space above the water in said receptacle; operating mechanism for supplying water to the receptacle by steam drawn from said steam space; and continuously supplying untreated water to the receptacle and discharging water therefrom in such manner as to heat the inflowing water by transfer of heat from the outflowing water.

3. The method of preparing water for ice-making, consisting in maintaining the water above its boiling point at atmospheric pressure until practically all air is expelled therefrom in a receptacle closed against the atmosphere; automatically maintaining a steam space above the water space in said receptacle; operating apparatus by steam constantly withdrawn from said space; delivering raw water into the upper part of the receptacle in such manner as to compel it to flow slowly through a succession of trays adapted to retain solid matter contained in the water; and continuously supplying untreated water to the receptacle and withdrawing treated water therefrom in such manner as to heat the incoming water by transfer of heat from the outgoing water.

4. The method of preparing water for ice-making, consisting in heating by live steam from a boiler the water above its boiling point at atmospheric pressure until practically all air has been expelled therefrom in a receptacle closed against the atmosphere and placed above the water level in the boiler; connecting the water outlet from said receptacle into the boiler; feeding the boiler through said receptacle; automatically governing water level in the boiler conjointly with supply to the receptacle; and discharging the treated water from the boiler through a heat exchanger which heats inflowing untreated water by the outgoing treated water.

CASSIUS CARROLL PECK.

Witnesses:
CLARENCE W. CARROLL,
JAMES MALLEY.

Copies of this patent may be obtained for five cents each, by addressing the "Commissioner of Patents, Washington, D. C."